United States Patent [19]

Nordqvist

[11] 4,443,261
[45] Apr. 17, 1984

[54] METHOD OF PREPARING GYPSUM ARTICLES

[75] Inventor: Sune Nordqvist, Handen, Sweden

[73] Assignee: Tenax Maskin AB, Handen, Sweden

[21] Appl. No.: 416,024

[22] Filed: Sep. 8, 1982

Related U.S. Application Data

[63] Continuation of Ser. No. 190,867, Feb. 22, 1980, abandoned.

[51] Int. Cl.³ .............................................. C04B 11/00
[52] U.S. Cl. ....................................... 106/109; 264/25
[58] Field of Search ........................... 264/25; 106/109

[56] References Cited

U.S. PATENT DOCUMENTS

| | | | |
|---|---|---|---|
| 1,300,269 | 4/1919 | Hoskins | 106/109 |
| 1,442,406 | 1/1923 | Hennicke | 106/109 |
| 3,841,886 | 10/1974 | Burr | 106/109 |
| 4,146,402 | 3/1979 | Kira et al. | 106/109 |

FOREIGN PATENT DOCUMENTS

| | | |
|---|---|---|
| 432542 | 8/1926 | Fed. Rep. of Germany . |
| 1267160 | 4/1968 | Fed. Rep. of Germany . |
| 1371015 | 10/1974 | United Kingdom . |

*Primary Examiner*—James H. Derrington
*Attorney, Agent, or Firm*—Burns, Doane, Swecker & Mathis

[57] ABSTRACT

Plaster products can be prepared from calcium sulfate dihydrate by adding to a water slurry of calcium sulfate dihydrate a potassium salt, especially potassium hydrogen-carbonate or potassium tetraborate but, in the first place, potassium sulfate, including a carrier, after which the water slurry is moulded and further worked in known manner to the desired plaster product, especially plaster board or moulds for the production of metal articles or ceramic articles.

4 Claims, No Drawings

METHOD OF PREPARING GYPSUM ARTICLES

This is a continuation of application Ser. No. 190,867, filed Feb. 22, 1980, now abandoned.

This invention relates to a process for the preparation of gypsum (plaster of Paris) articles, especially plaster board and moulds for the preparation of metallic and ceramic articles.

It is known to prepare plaster products by suspending gypsum (calcium sulfate semihydrate) in water, moulding the slurry to the desired product (desired shape) and solidifying (setting) this. Various additives can be added to the prepared slurry of calcium sulfate semihydrate in water, such as accelerators, retardants and resins. The solidification is apparently due to the fact that the semihydrate is hydrated forming dihydrate (calcium sulfate dihydrate).

To obtain the starting material of the gypsum product preparation, i e calcium sulfate semihydrate (hemihydrate, half-hydrate), it is started from calcium sulfate dihydrate (here also called dihydrate gypsum), the content of water of crystallization being reduced by burning. This burning requires large amounts of energy and, moreover, must be carefully controlled so that a correct content of water of crystallization is obtained.

It is also known to prepare the calcium sulfate hemihydrate by eliminating water from calcium sulfate dihydrate by using the strong water absorbing agent sulfuric acid under hot conditions. Thus, the German laid open print (Auslegeschrift) 1 274 488 teaches the preparation of calcium sulfate hemihydrate by treating calcium sulfate dihydrate with a hot (above 80° C.) solution (about 12.7 to 37.2% by weight) of sulfuric acid, optionally together with modifyers of the crystal form and/or grafting crystals.

Now it has been found that plaster (gypsum) products, preferably plaster boards and moulds for the production of metal articles and ceramic articles, can be produced by adding to a water slurry of calcium sulfate dihydrate (dihydrate gypsum) a potassium salt optionally in combination with a carrier and then, in known manner, the product is moulded and further treated, the slurry being kept below 70° C., preferably below 55° C. The potassium salt consists preferably of potassium hydrogencarbonate or potassium tetraborate but, in the first place, potassium sulfate. The potassium salts can be used as such or mixed with each other, e.g. a mixture of potassium sulfate and potassium hydrogencarbonate, and optionally dissolved in water or together with a carrier, e.g. sodium sulfate.

The density of the resulting plaster product can be adjusted by addition of various additives and through the mixing procedure (air being added). An addition of a wetting agent is suitable for this adjustment of the density. When using potassium hydrogencarbonate a foam product is obtained and the expansion (the degree of blowing) can be adjusted by using potassium sulfate together with the potassium hydrogencarbonate, the proportions thereof being varied all according to the desired product.

As starting material the calcium sulfate dihydrate resulting as waste in the preparation of phosphate fertilizers, such as different calcium phosphates and phosphoric acid, is preferably used. This starting material shows usually an analysis of

| | |
|---|---|
| $H_3PO_4$ | about 0.1% by weight (calculated as P) |
| $H_3PO_4$, non-dissolved | about 0.3% by weight (calculated as P) |
| F | about 1.0% by weight |
| Silicate | about 2% by weight |
| Heavy metals | about 2% by weight |
| Leaching water | pH 2–3 |
| Water | about 25% by weight |
| Grain Size | 70% <74 μm |

Other starting materials can be used, e.g. dihydrate gypsum, which is obtained at purification of flue gas, and naturally occurring dihydrate gypsum. It is also possible to re-use as starting material the products obtained according to the present invention, which are then crushed and suspended in water.

The amount of potassium salt added, especially potassium sulfate, can vary, the minimum amount being about 2 or 3% by weight; 5–40%, preferably 6–20%, calculated on the amount of calcium sulfate dihydrate ($CaSO_4.2 H_2O$) have turned out to be suitable amounts.

It has also been found that different agents can be admixed in the present starting slurry, plaster products being obtained with different modifications of the properties. It is possible to add semihydrate gypsum. Addition of water glass, such as silicate of soda, increases the hardness. Plastics, such as polyacrylates and melamine resins, or plastic starting materials hardening simultaneously with the solidification of the plaster products can be added for increasing the strength or the water resistance. Other additives are calcium silicate, carboxymethyl cellulose, bentonite and cement.

Such additives as create porosity, e.g. of silicate type, are of special importance. These additives e.g. consist of perlite or vermiculite. The resulting products, e.g. boards or moulds, are heat insulating and have a good stiffness in flexing at a suitable thickness.

The potassium hydrogencarbonate is used according to the invention by itself for preparation of solidified, hard plaster foam products. However, the potassium hydrogencarbonate is preferably used together with potassium sulfate and other of the indicated additives for the preparation of solidified plaster products. Instead of potassium hydrogencarbonate other additives, such as sodium hydrogencarbonate, hydrogen peroxide, ammonium carbonate, aluminium bronze, which give off gas under the preparation conditions, can be used for the preparation of foam products. However, these additives do not contribute to the solidifying effect.

It is possible, and in many cases suitable, in preparation of the present plaster products to reinforce them by admixing e.g. steel fibres and/or glass fibres in the gypsum slurry. Such reinforcing means as rods and nets can be embedded at discontinuous production of moulds or boards or be cast at continuous production of plaster boards. The present plaster product, above all in the form of plaster board, can in known manner also be cast on cardboard, plastic, foils and films of another type, rubber cloth, wood or metal, for instance, These agents also contribute to an increase of the strength. A plaster product according to the invention which is not being provided with a surface layer in said manner can be immersed in or treated with a solution of e.g. potassium sulfate or a borate, such as potassium or sodium tetraborate, which increases the hardness and the strength. The hardness can also be increased by using as additive an agent, e.g. a salt, influencing the solubility of the gypsum, such as sodium thiosulfate, methaphosphate and hexamethaphosphate.

An additive which has been found to provide surprisingly good plaster products, mainly plaster board, is concentrated spent sulfite liquor, especially on sodium base. Using agent sulfite liquor as additive, the surface layer adhesion, especially of cardboard, to the plaster board is improved to a very large extent. The strength is also improved. Another agent also improving the surface layer adhesion is corn starch. However, this provides inferior results in comparison with spent sulfite liquor.

Other additives can also be used, e.g. agents retarding the setting rate, such as soda, glycerol, alginate. Other additives are sulfuric acid, hydrogen hexafluorosilicate, citric acid, ammonium carbonate (hartshorn), urea phosphate, ammonia. These agents are i.e. used for adjustment of pH.

If plaster products very resistant to high temperatures are desired, it is suitable to admix magnesium oxide in the form of a powder. The magnesium oxide can comprise up to 50% by weight of the calcium sulfate dihydrate. It is also suitable to admix perlite.

For variation of the density of the plaster products the water content can also be varied, i.e. you can dilute the calcium sulfate dihydrate slurry with water, e.g. so that 70% of the slurry consist of water, or admix various wetting agents. To obtain plaster products with an especially low density the agents giving off gas and already described are used.

At the description of the present invention it has been indicated that the slurry of calcium sulfate dihydrate "solidifies" or "is set". However, the process of the invention might also be considered to consist in a "solidification" of the calcium sulfate dihydrate, i.e. the included grains and the whole plaster product prepared will be harder. When carrying out the process the grain size of the potassium sulfate is of a certain importance, as the process is quicker the more fine granular the potassium sulfate is. Potassium sulfate with a grain size of down to 70 $\mu$m has been tested and this grain size will provide about the same rate of solidification as an aqueous solution of potassium sulfate. Of course, solutions and salts and the like providing potassium sulfate when mixed are equivalent to potassium sulfate. Thus, a solution of potassium chloride and a solution of magnesium sulfate can be used by adding them simultaneously, for instance. The various indicated additives are usually used in an amount of 1-15% by weight calculated on the included amount of calcium sulfate dihydrate.

The temperature of the water slurry shall be kept below 70° C. all the time. In this way no substantial formation of calcium sulfate semihydrate is obtained even in the case where dehydrating agents as sulfuric acid, are present. The temperature of the slurry should preferably be kept below 55° C., as e.g. below 45° C. or 50° C., also during the drying and setting steps.

It has also been found that the use of microwave radiation, particularly in the wave length range of 1-10 cm, gives plaster products having a higher degree of crystallization in the centre and also better strength properties. This embodiment is preferred for the preparation of plaster board.

The invention is described more in detail in the following examples.

EXAMPLE 1

50 kg $K_2SO_4$ were added to 1000 kg slurry of dihydrate gypsum containing 20% water. Addition was carried out under vigorous stirring at 1400 rpm. The slurry was immediately cast to a board and cubic test bodies (5 cm×5 cm×5 cm) were made. The board having ambient temperature about 20° C. solidified in a very short time (some minutes). The test bodies showed a compression strength of 8 MPa after 24 h.

EXAMPLE 2

3600 kg of potassium sulfate in solid form were added to 3600 kg of a slurry of dihydrate gypsum under vigorous stirring, such as in example 1. Board and test bodies were prepared as in example 1. The density of the resulting board was 1.1-1.3 g/cm$^3$. The compression strength of the test bodies was 4.1 MPa as determined after 96 h at 20° C. or 48 h at 40° C.

EXAMPLE 3

1000 kg of dihydrate gypsum of 72% were mixed with 35 kg of ammonium hydrogencarbonate and 60 kg of potassium sulfate. The mixture was cast in plane slabs. After a setting period of 15-20 minutes at 13° C. a board with good strength properties was obtained.

EXAMPLE 4

100 kg of semihydrate gypsum, 1000 kg of dihydrate gypsum of 72-73%, 35 kg of ammonium carbonate and 60 kg of potassium sulfate were mixed. After a setting period of 15-20 minutes at 13° C. after casting to board, board of somewhat inferior properties than those according to example 1 were obtained.

EXAMPLE 5

1000 kg of 72% dihydrate gypsum in the form of a slurry were mixed with 55 kg of potassium sulfate having a grain size of 70% less than 80 $\mu$m. Slabs were prepared on a plaster board machine, solidified and dried by microwave radiation for 2 seconds repeated six times in a 4 minutes' period. The temperature of the slurry was maximum about 44° C.; locally it seemed as a slightly higher temperature temporarily was reached.

EXAMPLE 6

A slurry of 72% dihydrate gypsum containing 1.5% spent sulfite liquor (dry substance) was continuously moulded to a thickness of about 13 mm on a running web of paper board on a plaster board machine. Potassium sulfate (7% by weight based on dry dihydrate gypsum) was added to the slurry during the moulding. It was in a fine granular form (80% passing a 70 $\mu$m mesh sieve). The moulded slabs were solidified and dried in a conventional way, the slurry having a maximum temperature of about 41° C. Wall board of about 13 mm with good strength properties was obtained.

What is claimed is:

1. A method of preparing solidified calcium sulfate dihydrate comprising:
   adding potassium sulfate to a water slurry of calcium sulfate dihydrate in an amount of at least 5% by weight of the calcium sulfate dihydrate; and
   solidifying the said solution while maintaining the solution at a temperature below 70° C.

2. The method as claimed in claim 1, wherein the slurry is kept below 55° 1 C.

3. The method as claimed in claim 1 characterized in that the potassium sulfate is added as an aqueous solution.

4. The method as claimed in any one of claims 2, 3 or 1 characterized in that setting of the gypsum is accomplished by means of microwave radiation.

* * * * *